Patented Sept. 15, 1953

2,652,408

UNITED STATES PATENT OFFICE 2,652,408

PREPARATION OF ANTHRAQUINONE COMPOUNDS

Hans Z. Lecher, Plainfield, and Karl C. Whitehouse, Somerville, N. J., assignors to American Cyanamid Company, New York, N. Y., a corporation of Maine No Drawing. Application July 14, 1951, Serial No. 236,844

14 Claims. (Cl. 260—369)

1

This invention relates to the manufacture of anthraquinones from mixtures containing 1,4-naphthoquinone.

Anthraquinone is one of the most important intermediates in the manufacture of vat dyes and is produced on a very large scale. In the past, two processes have been in practical use. In Europe, where pure anthracene is available at moderate cost, anthraquinone has been produced by either chemical or vapor-phase catalytic oxidation. In the United States, due to the unavailability of pure anthracene at a reasonable price, the only practical process has been a two-step process using phthalic anhydride and benzene. The first step involves the Friedel-Crafts reaction, using aluminum chloride as a catalyst and producing o-benzoylbenzoic acid; the second step consists in ring closure by dehydration to form anthraquinone. Although this process has been used for many decades on a very large scale, it has presented a number of serious drawbacks, particularly in large scale production. In the first place, large quantities of aluminum chloride are required, which increases the cost. In the second place, the hydrogen chloride produced in the reaction presents a very serious corrosion problem. Another drawback is that in recent years the supply of essential raw materials such as benzene, aluminum, and chlorine has become much less adequate for the mounting demand.

The present invention relates to a process in which an anthraquinone is produced from 1,4-naphthoquinone. The basic reaction is not new and involves the production of an adduct of 1,4-naphthoquinone and 1,3-butadiene by the Diels-Alder reaction, followed by the dehydrogenation of the tetrahydroanthraquinone which results from the first step. 1,4-Naphthoquinone in reasonable purity is almost a laboratory curiosity, although it is obtained in enormous tonnage as a by-product in the vapor-phase catalytic oxidation of naphthalene to phthalic anhydride. The presence of 1,4-naphthoquinone in the converter product of phthalic anhydride plants constitutes a nuisance requiring additional care in purification, because the quinone tends to form colored compounds, which lower the quality of the phthalic anhydride produced. It is economically prohibitive to attempt to recover pure naphthoquinone from the converter product.

The present invention depends on the discovery that a converter product, even one containing as little as 10% 1,4-naphthoquinone, can be used to produce a pure anthraquinone in excellent yields and that the phthalic anhydride

2 can be recovered in the form of phthalic acid. It is not known why the extremely reactive phthalic anhydride behaves as almost completely inert material in the process of the present invention and hence the invention is not intended to be limited to any theory of why, under the conditions of the reaction, the phthalic anhydride is substantially completely inactive.

Although, as pointed out above, it is possible to use, in the process of the present invention, the converter product containing as little as 10% naphthoquinone, it is, of course, economically desirable to start with a raw material having a higher naphthoquinone content. Such a converter product can be produced with highly stabilized vanadium catalysts at low oxidation temperatures. The production of converter products containing a relatively high naphthoquinone-phthalic anhydride ratio is not claimed in the present application as it forms the subject matter of the copending applications, Serial No. 236,842, filed July 14, 1951, and Serial No. 236,843, filed July 14, 1951.

The converter products relatively rich in naphthoquinone referred to above present a further unusual situation when obtained by the aid of a highly stabilized catalyst, i. e., one which has a high content of alkali metal compounds such as potassium salts, and at low temperature. Then, the catalytic oxidation of naphthalene is not complete and considerable amounts of unreacted naphthalene are present in the converter products. In the ordinary production of phthalic anhydride the presence of unreacted naphthalene is to be avoided at all costs as it presents a very serious purification problem. In the converter products used in the present invention, however, the unoxidized naphthalene is not only no drawback but actually improves the process and is therefore desirable. The use of converter products containing unreacted naphthalene therefore constitute the preferred embodiment of the present invention. The exact reason why these converter products, which are worthless for ordinary phthalic anhydride production are preferable in the process of the present invention has not been fully determined. Therefore, the invention is not intended to be limited to a particular theory of why unreacted naphthalene offers an advantage. It seems probable, however, that one factor may be the fluxing by the relatively low melting naphthalene in the first step of the process of the present invention where the Diels-Alder reaction takes place.

As has been pointed out above, the naphthoquinone to phthalic anhydride ratio of the converter product is by no means critical. In general, however, commercially useful results are obtained when the naphthoquinone to phthalic anhydride ratio is at least 1 to 9 and not more than 1 to 1. The practical ratios most frequently produced with proper catalysts are between 1 to 4 and 1 to 2. The amount of unreacted naphthalene in the converter product is in no way critical and as almost all of it is recovered in the process, large amounts of naphthalene may be present without adversely affecting the economics.

The basic importance and practical value of the present invention is not limited to the production of unsubstituted anthraquinone. That is to say that it is not necessary that 1,3-butadiene be used in the Diels-Alder step. On the contrary, it is an advantage of the present invention that it is generally applicable to open chain, conjugated diene compounds. It is thus possible to produce, by means of the present invention, not only anthraquinone but many substituted anthraquinones, some of which could not be produced before because of the unavailability or excessive cost of the substituted benzenes, used in the old Friedel-Crafts process. Among typical conjugated reaction diene compounds are: 3-chloro-1,3-pentadiene; 3-chloro-1,3-hexadiene; 2-chloro-3-methylbutadiene; 3-chloro-1, 3-octadiene; 2,3-dimethoxybutadiene; 2,3-dimethylbutadiene; 1-phenylbutadiene; 1,4-diphenylbutadiene; and 1,3,5-hexatriene. Particularly important substituted anthraquinones are those resulting from the use of 2-substituted butadienes, which, in accordance with the accepted nomenclature (Carothers and Berchet, Jour. Amer. Chem. Soc. 55, 2813-7 (1933)) will be referred to as orthoprenes. Among the most important orthoprenes which may be used in the process of the present invention are isoprene, 2-butyl-1, 3-butadiene, 2-heptyl-1, 3-butadiene, 2-phenyl-1, 3-butadiene, 2-acetoxy-1, 3-butadiene, 2-ethoxy-1,3, butadiene, chloroprene and bromoprene. Many of the resulting 2-substituted anthraquinones are not obtainable by other methods or can not be produced at a cost which renders them practical as commercial products. The present invention, however, opens up a new field of vat dyes by making available for the first time at a reasonable cost new 2-substituted anthraquinones.

The first step of the process of the present invention may be carried out without a solvent to flux the phthalic anhydride and naphthoquinone, particularly when sufficient naphthalene is present to give a satisfactory reaction medium. Inert solvents may, of course, be used and are therefore included within the scope of the present invention. The temperature at which the first step is carried out is also in no way critical. However, as in many reactions, the speed drops with temperature and so, for best practical results, the temperature should not be lower than 70° C. Temperatures between 90° and 120° C. give excellent results and permit operating under moderate pressures in the case of the most volatile diene compounds. When the temperature is increased up to 150° C., the yield begins to decrease and the purity of the product becomes less because at these higher temperatures polymerization of naphthoquinone begins to become sufficiently noticeable so that the lowered purity of the compound produced rapidly leads to a serious purification problem.

The product of the first step in the process of the present invention is essentially a mixture of phthalic anhydride, the tetrahydroanthraquinone corresponding to the diene compound used, and unreacted naphthalene where it is present in the converter product used as raw material. The addition of aqueous caustic alkali transforms both the tetrahydroanthraquinone and the phthalic anhydride to water-soluble non-volatile salts. Oxidation of the tetrahydroanthraquinone is easily effected by blowing air through this alkaline solution or by using conventional chemical oxidizers. This transforms the compound to the corresponding anthraquinone which is insoluble. Naphthalene is removed with great ease by steam stripping; in fact, the air oxidation and steam stripping may advantageously be effected in a single operation. After the naphthalene has been removed and the oxidation completed, the precipitated anthraquinone is filtered off, preferably, though not necessarily, hot, and washed with hot water. Phthalic acid is readily obtained from the filtrate by acidification. The losses of anthraquinone and phthalic anhydride are negligibly small.

Since the air oxidation of an alkali salt of a tetrahydroanthraquinone regenerates the alkali, it is not essential that all of the tetrahydroanthraquinone be dissolved as an alkali metal salt. In fact, it is sufficient if the amount of caustic alkali corresponds stoichiometrically to the phthalic anhydride present, with only a very slight excess over the amount necessary to insure complete solution of the phthalic anhydride as di-sodium phthalate. The saving of alkali presents an economic advantage.

The oxidation of the tetrahydroanthraquinone and its separation from the phthalic anhydride present can be effected by other means. The present invention, therefore, is directed particularly to the novel first step of the process, using converter products. In a more specific aspect, however, the preferred method of producing anthraquinone and separating it from phthalic anhydride and naphthalene is included.

Most of the commercially important dienes are very volatile and the Diels-Alder reaction is therefore carried out in an autoclave. As the reaction progresses the pressure rises to a maximum and then falls rapidly and steadily as the diene is consumed. The end of the reaction is usually indicated when the pressure drop has substantially ceased.

The invention will be described in greater detail in the following examples, the parts being by weight unless otherwise specified.

*Example 1*

Naphthalene is oxidized in air at 340° C. over a fluid bed catalyst consisting of alumina and vanadium pentoxide, in the molar ratio 1 to 20, supported on potassium pyrosulfate and silica. Contact time is 4.5 seconds. In a typical run, 94 parts of naphthalene gives 85 parts of product consisting of 15 parts of naphthoquinone, 48 parts of phthalic anhydride, and 22 parts of naphthalene. The oxidation process is further described in the co-pending application for U. S. Patent Serial No. 236,842, filed July 14, 1951.

A steel autoclave is charged with 96 parts of such oxidation product, consisting of 15.8 parts of 1,4-naphthoquinone, 57.7 parts of phthalic anhydride, and 22.5 parts of naphthalene, together with 16.2 parts of 1,3-butadiene and a trace of copper chloride to inhibit polymerization. The reaction mixture is heated at 100° C. until the reaction is complete. Then the excess butadiene is vented and recovered in excellent yield by condensation. The reaction mixture is then discharged into 200 parts of water containing 41.5 parts of sodium carbonate, heated gently to 90–95° C., treated with 8 parts of sodium hydroxide in the form of 20% solution and thoroughly aerated at 90–95° C. with stirring. At the same time, the naphthalene is steam distilled out of the mixture. When oxidation is complete, the mixture is filtered hot and the filter cake washed with hot water and dried. The yield of anthraquinone is approximately 92% of theory. Acidification of the alkaline filtrate results in a substantially theoretical recovery of phthalic anhydride as phthalic acid.

*Example 2*

A steel autoclave is charged with 16.2 parts of butadiene and 44.7 parts of a mixture consisting of 7.9 parts of 1,4-naphthoquinone, 25.2 parts of phthalic anhydride, and 11.6 parts of naphthalene. The charge is held until reaction is substantially complete, cooled, excess butadiene recovered as in Example 1, and the reaction discharged into a solution of 13.7 parts of sodium hydroxide in 200 parts of water. The mixture is gently refluxed and aerated with a stream of air. Strong alkalinity is maintained. The initial deep red brown color gradually changes to pale yellow brown. The naphthalene is steam stripped from the mixture concurrently with the aeration. The anthraquinone is filtered, washed, and dried. The yield is 9.8 parts, or approximately 94% of theory. Acidification of the alkaline filtrate, followed by filtration, gives approximately a 94% recovery of phthalic acid.

The above examples describe the use of mixtures obtained by catalytic air oxidation of naphthalene. The operating procedure is substantially unaffected by variations in the amount of phthalic anhydride between 1 and 9 times the weight of naphthoquinone, although the quantities of butadiene, alkali, and other reagents are, of course, to be varied accordingly.

When a converter product is used which does not contain unreacted naphthalene, the reaction mixture does not flux at as low a temperature as when naphthalene is present. Amounts of naphthalene, up to 25% by weight of the total mixture, do not materially affect the yield. In the absence of naphthalene, steam distillation is, of course, unnecessary.

*Example 3*

A mixture of 3 parts of phthalic anhydride, one part of 1,4-naphthoquinone, one part of naphthalene, and 1.3 parts isoprene is heated in an autoclave at 100° C. until the reaction is complete. The melt is worked up as described in the preceding examples. A yield of approximately 90% of theory of 2-methylanthraquinone is obtained.

*Example 4*

A mixture of 67.6 parts of naphthalene oxidation product prepared as described in Example 1 (containing 15.8 parts of naphthoquinone), 26.6 parts of chloroprene, and 26.6 parts of xylene, is heated in an autoclave at 100° C. until the reaction is substantially complete, in the presence of traces of cupric chloride and phenothiazine as polymerization inhibitors. The resulting dark slurry is steam distilled to remove xylene and naphthalene while it is aerated and alkalinity is maintained by the addition of sodium carbonate and sodium hydroxide. When the oxidation is complete, the product is filtered and washed. An excellent yield of 2-chloroanthraquinone is obtained.

We claim:

1. In a process for making an anthraquinone compound by the Diels-Alder reaction of 1,4-naphthoquinone with an open chain conjugated diene followed by oxidation of the adduct, the improvement which comprises reacting the diene with a crude converter product resulting from the catalytic vapor phase oxidation of naphthalene, said converter product containing 1,4-naphthoquinone and phthalic anhydride in a ratio between 1 to 1 and 1 to 9.

2. A process according to claim 1 in which the ratio of 1,4-napthoquinone to phthalic anhydride is from 1:2 to 1:4.

3. A process according to claim 1 in which the diene is butadiene and the anthraquinone compound is anthraquinone.

4. A process according to claim 3 in which the ratio of 1,4-naphthoquinone to phthalic anhydride is from 1:2 to 1:4.

5. A process according to claim 1 in which diene is an orthoprene and the anthraquinone compound produced is substituted in the 2-position.

6. A process according to claim 5 in which the orthoprene is isoprene and the anthraquinone compound is 2-methylanthraquinone.

7. A process according to claim 6 in which the ratio of 1,4-naphthoquinone to phthalic anhydride is from 1:2 to 2:4.

8. A process according to claim 5 in which the orthoprene is chloroprene and the anthraquinone compound is 2-chloroanthraquinone.

9. A process according to claim 8 in which the ratio of 1,4-naphthoquinone to phthalic anhydride is from 1:2 to 1:4.

10. A process according to claim 1 in which the reaction mixture obtained from the converter product and the diene is treated with an amount of aqueous caustic alkali greater than the stoichiometrical equivalent of the phthalic anhydride present, and the tetrahydroanthraquinone compound resulting from the reaction of the diene with 1,4-naphthoquinone is oxidized to the corresponding anthraquinone compound by means of air.

11. A process according to claim 10 in which the ratio of 1,4-naphthoquinone to phthalic anhydride is from 1:2 to 1:4.

12. A process according to claim 1 in which the reaction temperature is from 90° to 120° C.

13. A process according to claim 12 in which the diene is butadiene.

14. A process according to claim 13 in which the 1,4-naphthoquinone to phthalic anhydride ratio is from 1:2 to 1:4.

HANS Z. LECHER.
KARL C. WHITEHOUSE.

References Cited in the file of this patent

UNITED STATES PATENTS

| Number | Name | Date |
| --- | --- | --- |
| 1,890,040 | Luttringhaus | Dec. 6, 1932 |
| 1,967,862 | Carothers et al. | July 24, 1934 |